(12) United States Patent
Yang et al.

(10) Patent No.: US 9,170,692 B2
(45) Date of Patent: Oct. 27, 2015

(54) CAPACITIVE IN-CELL TOUCH SCREEN, DRIVING METHOD FOR THE SAME, AND DISPLAY APPARATUS

(71) Applicant: BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 57 days.

(21) Appl. No.: 14/069,998

(22) Filed: Nov. 1, 2013

(65) Prior Publication Data
US 2014/0125626 A1 May 8, 2014

(30) Foreign Application Priority Data

Nov. 2, 2012 (CN) .......................... 2012 1 0434803

(51) Int. Cl.
G06F 3/044 (2006.01)
G06F 3/041 (2006.01)
G02F 1/1343 (2006.01)
G02F 1/1333 (2006.01)

(52) U.S. Cl.
CPC .......... G06F 3/044 (2013.01); G02F 1/134336 (2013.01); G06F 3/0412 (2013.01); G02F 1/13338 (2013.01); G02F 2001/134318 (2013.01)

(58) Field of Classification Search
CPC ................. G06F 223/04111; G06F 223/04112
USPC ............................................................ 349/12
See application file for complete search history.

(56) References Cited

U.S. PATENT DOCUMENTS

| 7,679,596 B2* | 3/2010 | Kim et al. ........................ 345/98 |
| 2007/0262943 A1* | 11/2007 | Kang .............................. 345/98 |
| 2008/0062140 A1* | 3/2008 | Hotelling et al. .............. 345/173 |

(Continued)

FOREIGN PATENT DOCUMENTS

| CN | 102314248 A | 1/2012 |
| CN | 102736788 A | 10/2012 |

OTHER PUBLICATIONS

First Chinese Office Action Appln. No. 201210434803.9; Dated Feb. 2, 2015.

Primary Examiner — Chanh Nguyen
Assistant Examiner — Daniel Duong
(74) Attorney, Agent, or Firm — Ladas & Parry LLP

(57) ABSTRACT

The embodiments of the disclosure provides a capacitive in-cell touch panel, a driving method thereof and a display apparatus, wherein touch sensing electrodes are set on a color filter substrate, a common electrode layer connected as a whole plane on a TFT array substrate is divided into strips to be used as touch driving electrodes; touch driving signal lines are set in a display area of the touch panel by adopting a dual gate structure, which is helpful for a narrow frame design of the touch panel; each of the touch driving electrodes is electrically connected to at least one touch driving signal line and is supplied with a driving signal by a plurality of touch driving signal lines simultaneously, such that transmission efficiency of the driving signal can be improved to the maximum extent and delay of the driving signal can be reduced.

14 Claims, 7 Drawing Sheets

(56) References Cited

U.S. PATENT DOCUMENTS

| | | | |
|---|---|---|---|
| 2010/0302201 A1* | 12/2010 | Ritter et al. | 345/174 |
| 2011/0267293 A1* | 11/2011 | Noguchi et al. | 345/173 |
| 2012/0218482 A1* | 8/2012 | Hwang et al. | 349/12 |
| 2012/0249444 A1* | 10/2012 | Lee et al. | 345/173 |
| 2012/0262389 A1 | 10/2012 | Kida et al. | |

* cited by examiner

CAPACITIVE IN-CELL TOUCH SCREEN, DRIVING METHOD FOR THE SAME, AND DISPLAY APPARATUS

TECHNICAL FIELD OF THE DISCLOSURE

The present disclosure relates to a technical field of display, and particularly to a capacitive In-Cell touch panel, a driving method for the same and a display apparatus.

BACKGROUND

With fast development of display technology, touch panels have been widely used in human life. At present, touch panels can be divided, in terms of structure, into Add-on mode touch panel, On-Cell touch panel and In-Cell touch panel. The Add-on mode touch panel is formed by manufacturing a touch panel and a liquid crystal display (LCD) screen separately and bonding them together to be a liquid crystal display screen with a touch function, so the Add-on mode touch panel has disadvantages of higher cost, lower light transmission rate, thicker modules, etc. The In-Cell touch panel is formed by embedding touch electrodes of a touch panel inside a liquid crystal display screen, so in the in-cell touch panel, the thickness of module can be reduced and the production cost of the touch panel can also be largely reduced, and thus the in-cell touch panel is a favorite choice for various panel manufactories.

In order to improve aperture ratio of a touch display screen to the maximum extent, a dual gate structure can be adopted in design of a pixel structure in a TFT array substrate of the touch panel. As shown in FIG. 1, in the dual gate structure, two gate signal lines are arranged between two adjacent rows of pixel units on the TFT array substrate, for example, (Gate 1 and Gate 2), (Gate 3 and Gate 4), (Gate 5 and Gate 6); in addition, two adjacent columns of pixel units constitute a group and commonly use a same data signal line located between the two adjacent columns of pixel units, for example, Data 1, Data 2, Data 3. In the dual gate structure, the number of the data signal lines and the number of source driver ICs can be reduced at the cost of doubling the number of the gate signal lines, thereby reducing the cost of the display as a whole. However, design of a capacitive In-Cell touch panel based on a dual gate structure does not exist at present.

SUMMARY

Embodiments of the present disclosure provide a capacitive in-cell touch panel, a driving method thereof and a display apparatus for implementing a capacitive in-cell touch panel with a dual gate structure.

According to an aspect of the present disclosure, there is provided a capacitive in-cell touch panel includes: a color filter substrate, a thin film transistor (TFT) array substrate having a common electrode layer, and a liquid crystal layer between the color filter substrate and the TFT array substrate, wherein a plurality of pixel units arranged in a matrix are set in the capacitive in-cell touch panel; two gate signal lines are arranged between two adjacent rows of pixel units on the TFT array substrate, and two adjacent columns of pixel units constitute a group and commonly use a same data signal line located between the two adjacent columns of pixel units, wherein:

the color filter substrate has a plurality of touch sensing electrodes;

the common electrode layer of the TFT array substrate has a plurality of touch driving electrodes, each of which is electrically connected to at least one touch driving signal line located between two adjacent groups of columns of pixel units; during a display period of a frame of picture, each of the touch driving signal lines connected to the touch driving electrode is used to transmit a common electrode signal and a touch scanning signal to the touch driving electrode in a time division manner.

According to another aspect of the present disclosure, there is provided a display apparatus includes the above capacitive in-cell touch panel.

According to still another aspect of the present disclosure, there is provided a driving method of the above capacitive in-cell touch panel including:

Dividing a time period for the touch panel displaying a frame of picture into a display period and a touch period;

During the display period, supplying a common electrode signal to the touch driving electrodes, meanwhile supplying gate scanning signals to each of the gate signal lines in the touch panel sequentially and supplying gray scale signals to the data signal lines so as to control deflection of liquid crystal molecules;

During the touch period, supplying the touch driving electrodes with the touch scanning signals which are then coupled by the touch sensing electrodes to generate and output voltage signals, meanwhile no signal being supplied to each of the gate signal lines and each of the data signal lines of the touch panel.

In the above capacitive in-cell touch panel, the above driving method and the above display apparatus, the touch sensing electrodes are set on the color filter substrate, the common electrode layer connected as a whole plane on the TFT array substrate is divided into strips to be used as touch driving electrodes; by adopting the dual gate structure in the TFT array substrate, positions of a part of data signal lines can be saved at the cost of doubling the number of the gate signal lines, and the touch driving signal lines can be set in the saved positions, which is helpful for a narrow frame design of the touch panel as compared to arrangement in the prior art wherein the touch driving signal lines are set in a non-display area of the touch panel; each touch driving electrode is electrically connected to at least one touch driving signal line and is supplied with a driving signal by a plurality of touch driving signal lines simultaneously, such that transmission efficiency of the driving signal can be improved to the maximum extent and delay of the driving signal can be reduced. Moreover, since the touch function and the display function are driven in the time division manner, on one hand, the chip for implementing the display driving and the chip for implementing the touch driving can be integrated together, so that the production cost can be further reduced; on the other hand, the time division driving of the touch function and the display function can also reduce the interference between the display function and the touch function, so that picture quality and touch accuracy can be enhanced.

DETAILED DESCRIPTION

At present, the liquid crystal display technology capable of achieving a wide viewing-angle mainly includes an In-Plane Switch (IPS) technology and an Advanced Super Dimension Switch (ADS) technology. The ADS technology makes the liquid crystal molecules with any orientation between and above the slit electrodes in the liquid crystal cell rotate by forming a multi-dimension electric field through an electric field generated by edges of the slit electrodes in a same plane and an electric field generated between a layer of the slit electrodes and a layer of plate electrodes, so that the operational efficiency of the liquid crystal molecules and the light transmission rate can be improved. The ADS technology can also improve the picture quality of a TFT-LCD product, and has advantages of high definition, high light transmission rate, low power consumption, wide view-angle, high aperture ratio, low chromatic aberration, and without push Mura, etc. H-ADS (high aperture ratio-advanced super dimension switch) technology is an important implementation of the ADS technology.

In an embodiment of the present disclosure, a new capacitive in-cell touch panel structure is proposed based on the ADS technology and the H-ADS technology. Detail descriptions will be given below to particular implementations of the capacitive in-cell touch panel, the driving method thereof and the display apparatus provided in the embodiments of the present disclosure with reference to the accompanying drawings.

In the accompanying drawings, width and shape of respective thin film layers do not reflect the real scale of the TFT array substrate or the color filter substrate and are only for the purpose of schematically illustrating the embodiment of the present disclosure.

Figure 1:
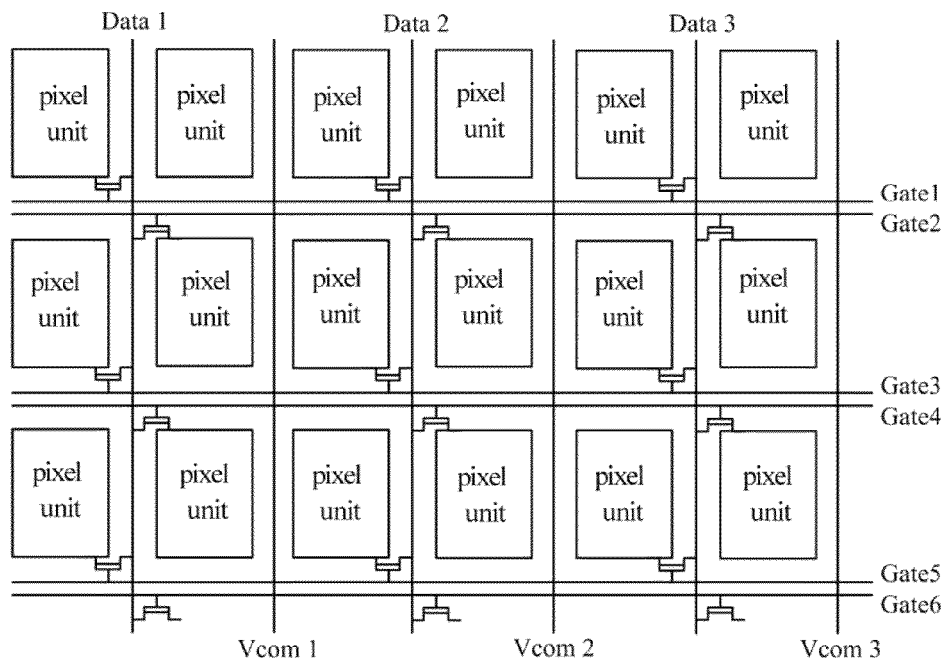
FIG. 1 is a schematic structure diagram of a dual-gate structure in a display panel in the prior art.
Figure 2:
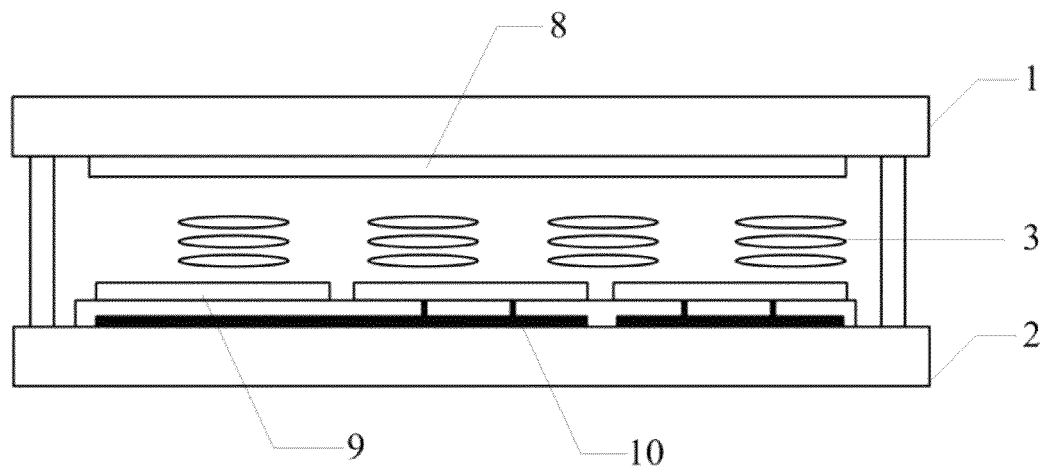
FIG. 2 is a schematic longitudinal sectional view of a capacitive in-cell touch panel provided in the embodiment of the present disclosure.
Figure 3:
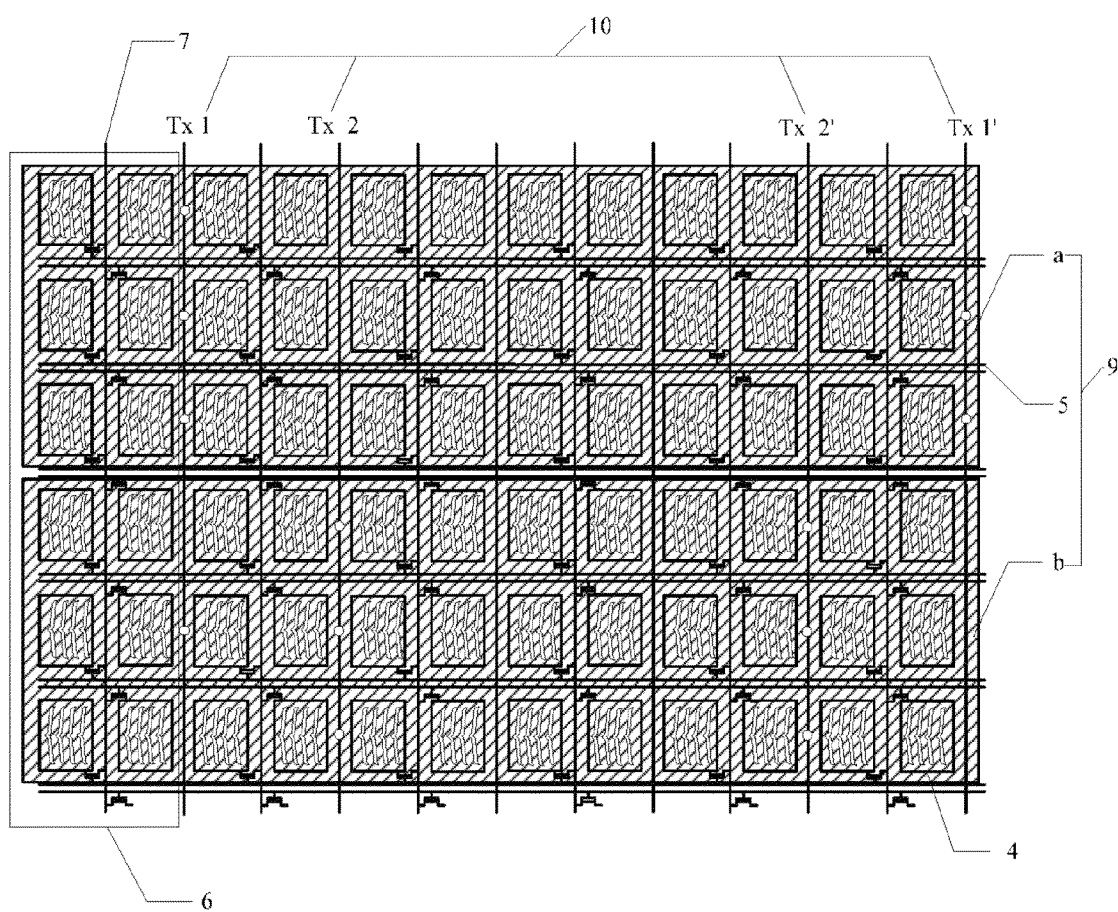
FIG. 3 is a schematic top view of a TFT array substrate in the capacitive in-cell touch panel provided in the embodiment of the present disclosure.

FIG. 2 and FIG. 3 are a schematic longitudinal sectional view of a capacitive in-cell touch panel and a schematic top view of a TFT array substrate in the capacitive in-cell touch panel as provided in the embodiment of the present disclosure, respectively. As shown in FIG. 2 and FIG. 3, the capacitive in-cell touch panel provided in the embodiment of the present disclosure includes a color filter substrate 1, a thin film transistor (TFT) array substrate 2 having a common electrode layer, and a liquid crystal layer 3 between the color filter substrate 1 and the TFT array substrate 2, wherein a plurality of pixel units 4 arranged in a matrix are set in the capacitive in-cell touch panel; two gate signal lines 5 are arranged between two adjacent rows of pixel units 4 on the TFT array substrate, and two adjacent columns of pixel units 4 constitute a group 6 of columns of pixel units and commonly use a same data signal line 7 located between the two adjacent columns of pixel units 4. In the capacitive in-cell touch panel, the color filter substrate 1 has a plurality of touch sensing electrodes 8; on the common electrode layer of the TFT array substrate 2, there are a plurality of touch driving electrodes 9, each of which is electrically connected to at least one touch driving signal line 10 located between two adjacent groups 6 of columns of pixel units; during the display period of a frame of picture, each of the touch driving signal lines 10 electrically connected to the touch driving electrode 9 is used to transmit a common electrode signal and a touch scanning signal to the touch driving electrode 9 in a time division manner.

Preferably, in a particular implementation, in general, each of the individual touch sensing electrodes 8 is extended along the direction of columns of the pixel units 4 and each of the individual touch driving electrodes 9 is extended along the direction of rows of the pixel units 4. Of course, the directions for arranging the individual touch sensing electrodes and the individual touch driving electrodes may be altered according to size of the device applied, and no limitation is made thereto in the embodiment of the present disclosure.

In the above capacitive in-cell touch panel provided in the embodiment of the present disclosure, the touch sensing electrodes are set on the color filter substrate, the common electrode layer connected as a whole plane on the TFT array substrate is divided into strips to be used as touch driving electrodes for forming a touch electrode structure. Moreover, since the touch function and the display function are driven in the time division manner, on one hand, the chip for implementing the display driving and the chip for implementing the touch driving can be integrated together, so that the production cost can be further reduced; on the other hand, the time division driving of the touch function and the display function can also reduce the interference between the display function and the touch function, so that picture quality and touch accuracy can be enhanced.

Figure 4:
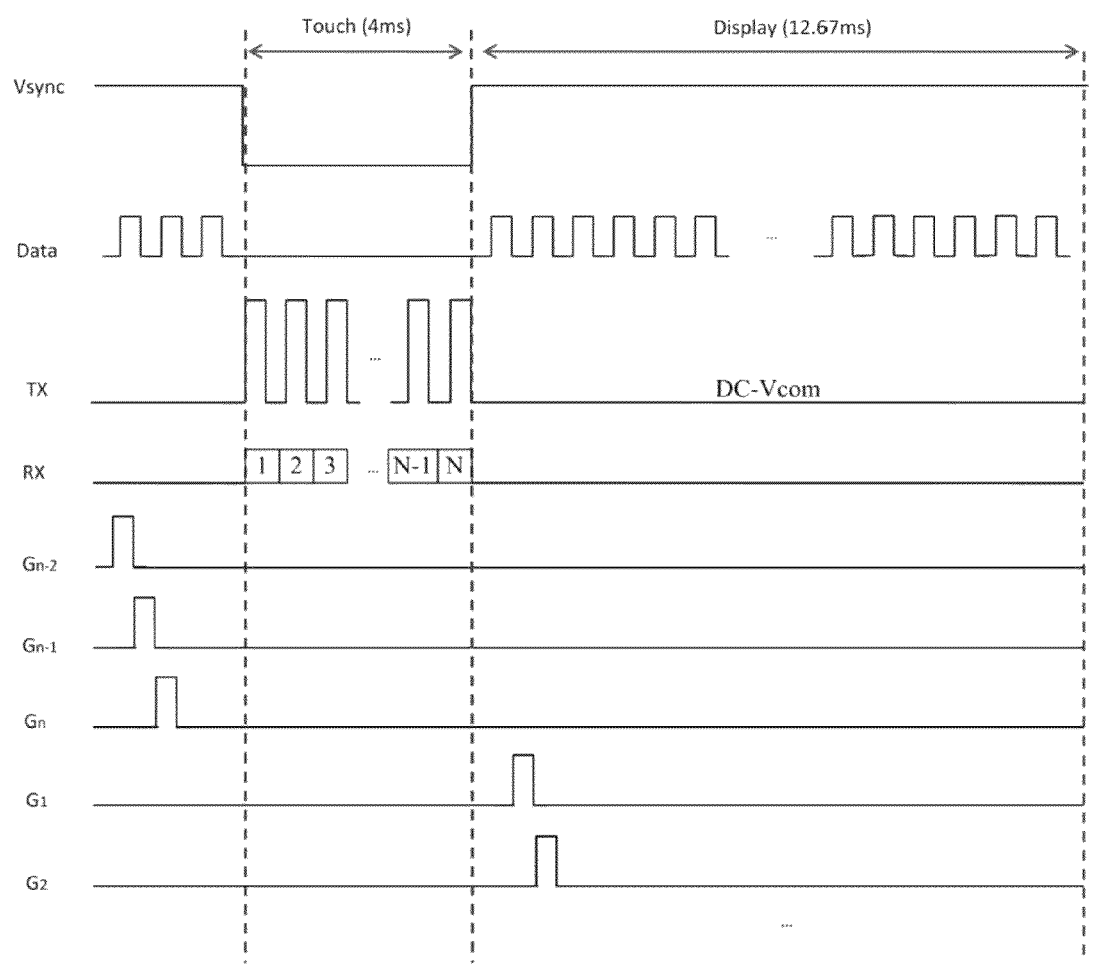
FIG. 4 is a schematic driving timing sequence diagram of the touch panel provided in the embodiment of the present disclosure.

Particularly, according to the timing sequence diagram as shown in FIG. 4, the driving method of the above capacitive in-cell touch panel provided in the embodiment of the present disclosure includes the following steps.

Firstly, the time period for the touch panel displaying a frame of picture (Vsync) is divided into a display period (Display) and a touch period (Touch). For example, in the driving timing sequence diagram as shown in FIG. 4, the time period for the touch panel displaying a frame of picture is 16.67 ms, 4 ms therein is selected as the touch period and the remaining 12.67 ms is used as the display period. Of course, the lengths of the touch period and the display period can be appropriately adjusted according to the processing capability of the IC chip, no limitation is made thereto in the embodiment of the present disclosure.

During the display period (Display), a common electrode signal DC-Vcom is supplied to the touch driving electrodes Tx, meanwhile gate scanning signals are supplied to each of the gate signal lines G1, G2, . . . , Gn in the touch panel sequentially and gray scale signals are supplied to the data signal lines Data so as to control deflection of liquid crystal molecules. The operational principle for the driving method of the capacitive in-cell touch panel provided in the embodiment of the present disclosure during this period is same as that for the normal ADS liquid crystal panel.

During the touch period(Touch), the touch scanning signal is supplied to the touch driving electrode Tx, and is then coupled by the touch sensing electrodes Rx to generate and output a voltage signal. An induction capacitance between two electrodes at the position where a point touched by a finger is located changes when the touch occurs, amplitude of the voltage signal received at the end of the touch sensing electrode Rx also changes, thereby implementing the touch function. During the touch period, no signal is supplied to each of the gate signal lines and each of the data signal lines of the touch panel.

The touch function and the display function are driven in the time division manner in the above capacitive in-cell touch panel provided in the embodiment of the present disclosure, if the existing layout manner for the driving signal lines in the prior art is adopted in the above capacitive in-cell touch panel in large size, that is, a separate signal line is set for each of the touch driving electrodes in the non-display area of the touch panel, a significant non-display area of the touch panel would be occupied, which is helpless for a narrow frame design of the touch panel. In addition, there may be a large delay for the driving signals applied to the individual touch driving electrodes in the touch panel in large size, which will affect strength of the touch signal collected by the touch sensing electrodes and is helpless for improvement of the sensitivity of the touch sensing.

Therefore, in the capacitive in-cell touch panel provided in the embodiment of the present disclosure, by adopting the dual gate structure in the TFT array substrate, position of a part of data signal lines can be saved at the cost of doubling the number of the gate signal lines, and the touch driving signal lines can be set in the saved position, which is helpful for a narrow frame design of the touch panel as compared to arrangement in the prior art wherein the touch driving signal lines are set in a non-display area of the touch panel; in addition, one touch driving electrode is electrically connected to at least one touch driving signal line, for example, as shown in FIG. 3, two touch driving signal lines Tx1 and Tx1' are connected to a touch driving electrode "a" simultaneously, and another two touch driving signal lines Tx2 and Tx2' are connected to a touch driving electrode "b" simultaneously, that is, a bilateral driving manner is adopted. In other words, one touch driving electrode 9 is supplied with a driving signal by a plurality of touch driving signal lines, such that transmission efficiency of the driving signal can be improved to the maximum extent and delay of the driving signal can be reduced.

Detail descriptions will be given below to the touch driving signal lines set in the TFT array substrate of the above touch panel.

In a particular implementation, the touch driving signal lines can be set on a same layer as the data signal lines in the TFT array substrate, such that no additional preparation process is added in the preparation of the TFT array substrate, and the pattern of the data signal lines and the touch driving signal lines can be formed by only one patterning process, thereby the preparation cost being saved and the additional value of product being improved.

Figure 5:
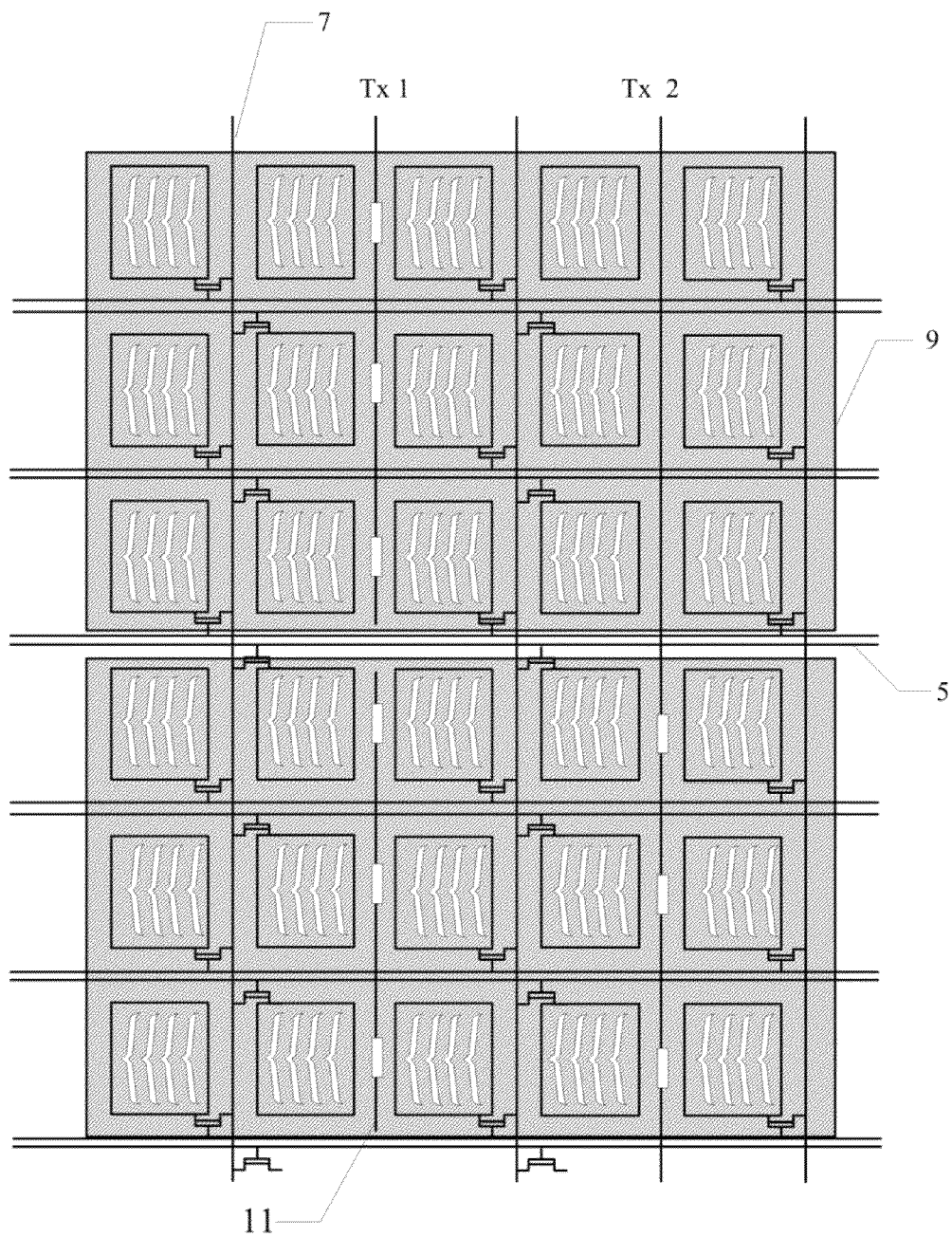
FIG. 5 is another schematic top view of a TFT array substrate in a capacitive in-cell touch panel provided in the embodiment of the present disclosure.

Particularly, as shown in FIG. 3 and FIG. 5, the individual touch driving signal lines TX1 and TX2 can be electrically connected to the corresponding touch driving electrodes 9 respectively through corresponding via-holes respectively, so as to supply the driving signals to the corresponding touch driving electrodes 9. In addition, since the touch driving signal lines TX1 and TX2 are usually formed by the metal material with a relative low resistance, when the touch driving electrodes 9 with a relative high resistance are electrically connected to the touch driving signal lines TX1 and TX2 through the via-holes respectively, the resistance as a whole may be reduced.

Furthermore, when each of the touch driving electrodes is electrically connected to a plurality of touch driving signal lines, the plurality of touch driving signal lines electrically connected to the same touch driving electrode can be connected through wires. As such, the number of the channels of the IC chip connected to the touch driving signal lines is not increased, and the requirements for the IC chip is reduced.

Figure 6:
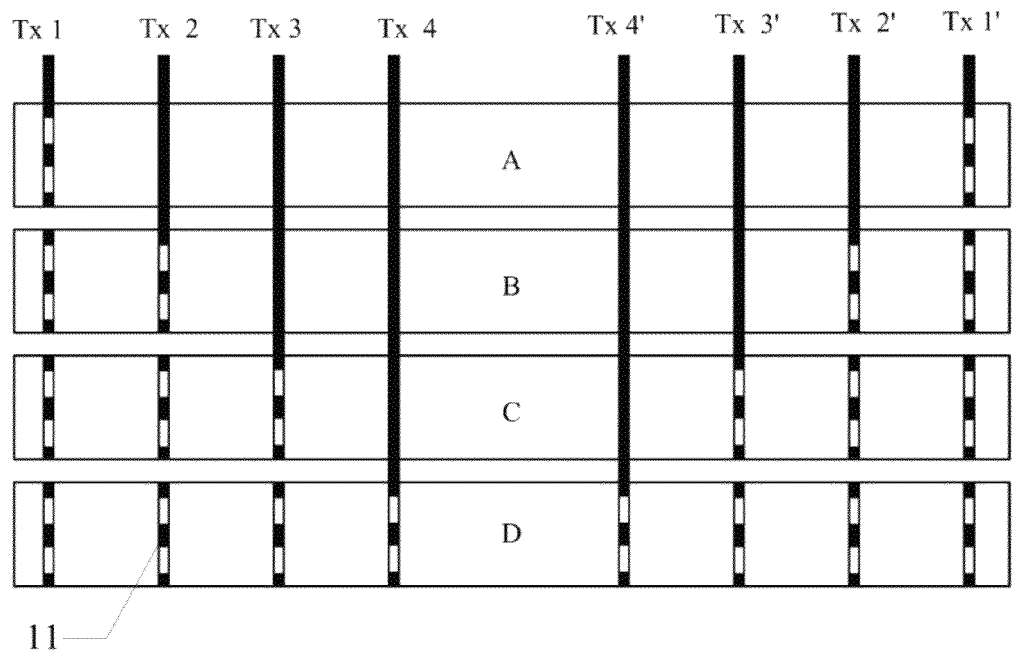
FIG. 6 is a schematic diagram showing a connection relationship between touch driving signal lines and touch driving electrodes as provided in the embodiment of the present disclosure.

Particularly, when the individual touch driving signal lines are set, as shown in FIG. 6, when the individual touch driving signal lines Tx1 and Tx1', Tx2 and Tx2', Tx3 and Tx3', Tx4 and Tx4' are electrically connected to the corresponding touch driving electrodes A, B, C, D, respectively, the touch driving signal lines originally extending across the touch panel are cut, so as to form the cut touch driving signal lines Tx1 and Tx1', Tx2 and Tx2', Tx3 and Tx3' and a plurality of metal lines 11 which are located at a same layer as the individual cut touch driving signal lines Tx1 and Tx1', Tx2 and Tx2', Tx3 and Tx3' and are isolated from each other. In addition, the individual metal lines 11 and the cut touch driving signal lines Tx1 and Tx1', Tx2 and Tx2', Tx3 and Tx3' form a co-linear relationship respectively, and each of the individual metal lines 11 is connected parallel to a corresponding touch driving electrode B, C or D, that is, each of the individual metal lines 11 is electrically connected to the correspondingly overlapping touch driving electrode B, C or D through a via-hole. In addition, the length of each of the individual metal lines 11 is not more than the width of the corresponding parallel touch driving electrode B, C or D. In such design, the gap between the adjacent groups of columns of pixel units is efficiently used, while the aperture ratio of the touch panel is ensured, the redundant portion of touch driving signal lines is used to set the metal lines with a relative low resistance, the metal lines with a relative low resistance and the individual touch driving electrodes with a relative high resistance are connected in parallel, so that the resistance as a whole can be reduced to the maximum extent.

Detail descriptions will be given below to the particular structure of the touch driving electrodes Tx set in the TFT array substrate and the touch sensing electrodes Rx set in the color filter substrate of the above touch panel.

In the above capacitive in-cell touch panel provided in the embodiment of the present disclosure, the touch sensing electrodes are set on the color filter substrate, and the common electrode layer connected as a whole plane on the TFT array substrate is divided into strips to be used as touch driving electrodes. In the above touch panel provided in the embodiment of the present disclosure, in order to reduce the induction capacitance formed at the position where any of the touch driving electrodes Tx overlaps any of the touch sensing electrodes Rx as much as possible in the case that it is ensured that the resistances of the touch driving electrodes Tx and the touch sensing electrodes Rx meet the requirements of the touch panel, the pattern of the strip-shaped touch driving electrodes Tx on the TFT array substrate is redesigned.

Figure 7:
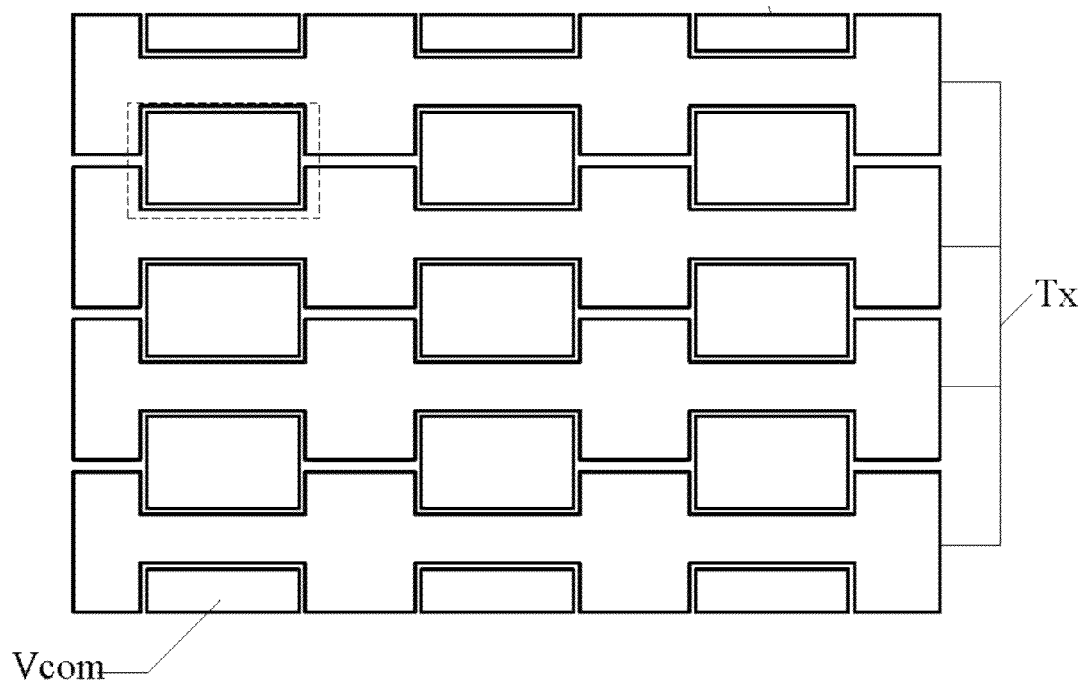
FIG. 7 is a schematic diagram of common electrode layer provided in the embodiment of the present disclosure.
Figure 8:
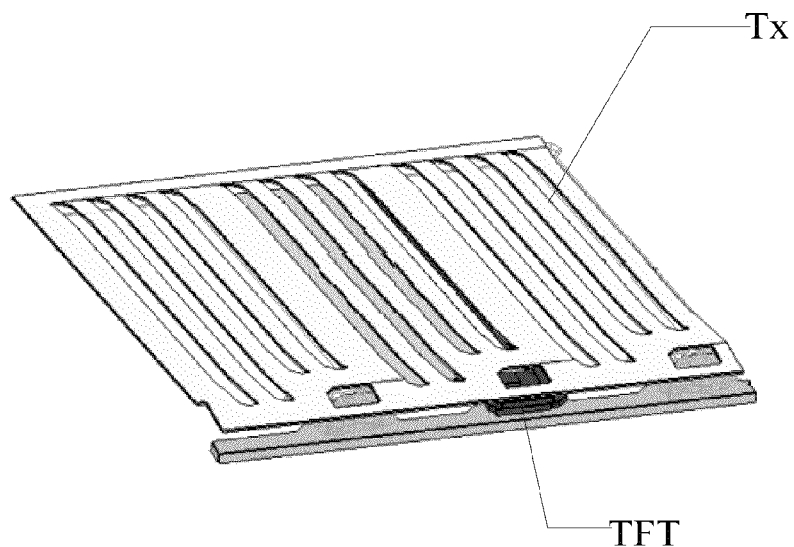
FIG. 8 is a schematic structure diagram of a pixel unit in the capacitive in-cell touch panel provided in the embodiment of the present disclosure.

For each of the touch driving electrodes Tx, as shown in FIG. 7, the region of the touch driving electrode Tx where it overlaps the touch sensing electrode Rx is set to have a concave structure, as shown in the dashed box in FIG. 7, so as to reduce the facing area therebetween, thereby reducing the induction capacitance formed at the overlapping region.

Further, in order to ensure the integrity of the common electrode layer comprising the individual touch driving electrodes Tx, as shown in FIG. 7, the common electrodes Vcom are set within the concave structures between the adjacent touch driving electrodes Tx and are isolated from the touch driving electrodes Tx, and a complete common electrode layer is formed by the common electrodes Vcom and the touch driving electrodes Tx together.

Further, in order to ensure that a common electrode signal can be applied to the common electrodes in the display period, at least one common electrode line electrically connected to the common electrodes is also set on the TFT array substrate, and the at least one common electrode line is arranged in the gap between adjacent groups of columns of pixel units where no touch driving signal line is set. Of course, known to those skilled in the art, in a specific implementation, the common electrode lines are not limited to be set in the gap between adjacent columns of pixel units and can be set along the direction of rows of the pixel units, no limitation is made for the wiring manner of the common electrode lines in the embodiment of the present disclosure.

Further, since the design of the concave structures of the touch driving electrodes Tx can reduce the overall area of each of the touch drive electrodes Tx and since parasitic capacitances can be generated between the touch driving electrode Tx and the gate of the TFT in the pixel unit, between the touch driving electrode Tx and the drain of the TFT in the pixel unit, and between the touch driving electrode Tx and the source of the TFT in the pixel unit, the reduction of the overall area of each of the touch driving electrodes Tx can reduce the number of TFTs corresponding to each of the touch driving electrodes Tx, thereby reducing the parasitic capacitance generated between the touch driving electrode Tx and the gate of the TFT in the pixel unit, the parasitic capacitance generated between the touch driving electrode Tx and the drain of the TFT in the pixel unit, and the parasitic capacitance generated between the touch driving electrode Tx and the source of the TFT in the pixel unit as a whole.

Figure 9:
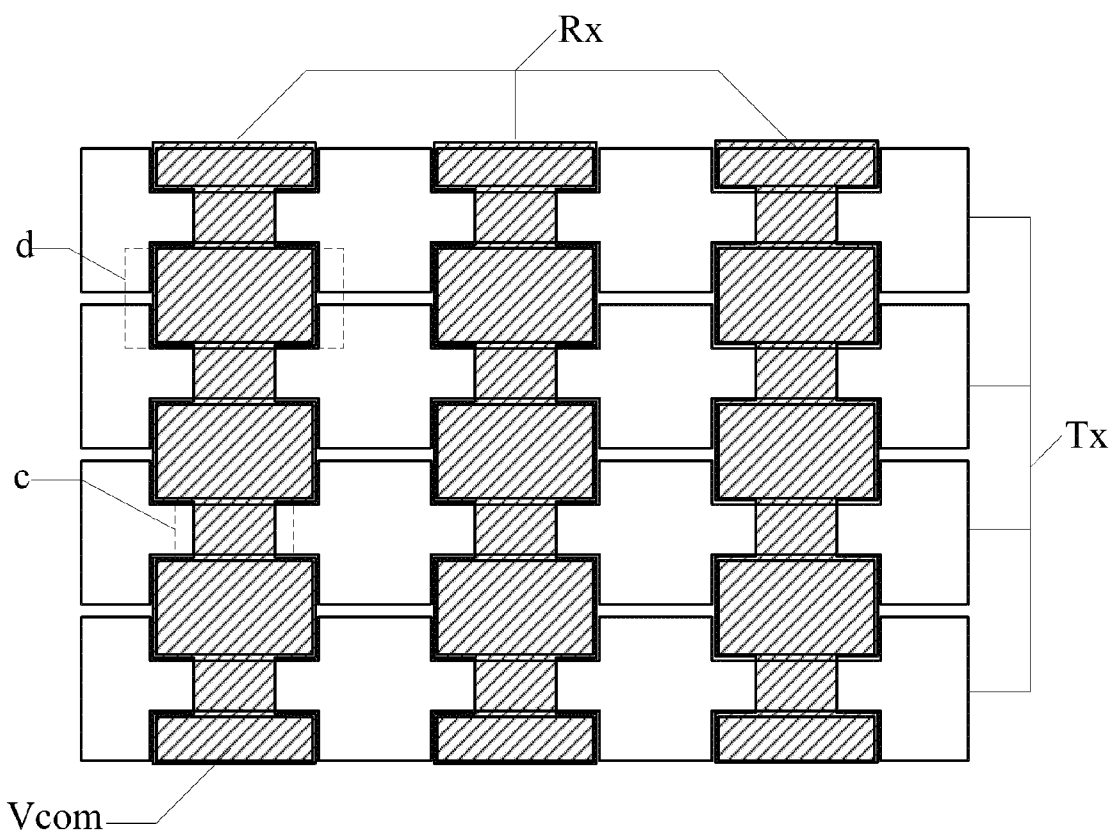
FIG. 9 is a schematic plan view of touch sensing electrodes and touch driving electrodes in the capacitive in-cell touch panel provided in the embodiment of the present disclosure.

Further, in order to reduce the facing area between the touch driving electrode Tx and the touch sensing electrode Rx as much as possible, when the touch sensing electrodes Rx are designed, each of the touch sensing electrodes Rx is set to have concave portions "c" overlapping with the touch driving electrode Tx, as shown in FIG. 9, so that the facing area between the touch driving electrode Tx and the touch sensing electrode Rx can be further reduced. However, the design of the concave portions "c" may increase the resistance of the touch sensing electrode, in order to solve such a problem, each of the touch sensing electrodes Rx is designed to have convex structures "d" overlapping with the common electrodes Vcom.

The test shows that: when the touch driving electrodes Tx and the touch sensing electrodes Rx are not redesigned, that is, the touch driving electrodes Tx and the touch sensing electrodes Rx belong to the conventional strip-shaped electrode structure, adopting the conventional ITO process (600 A, RS=45Ω/□), the touch driving electrode Tx and the touch sensing electrode Rx have an overlapping area of 5*5 mm, the resistance of the touch driving electrode Tx will be about 5 KΩ, the resistance of the touch sensing electrode Rx will be about 10 KΩ, and the induction capacitance generated at the position where the touch driving electrode Tx and the touch sensing electrode Rx overlap will be 20 pF. With the design shown in FIG. 6, adopting the conventional ITO process (600 A, RS=45Ω/□), the resistance of the touch driving electrode Tx will be less than 5 KΩ, the resistance of the touch sensing electrode Rx will be less than 10 KΩ, and the induction capacitance generated at the position where the touch driving electrode Tx and the touch sensing electrode Rx overlap will be less than 1 pF. It can be seen that the resistance of the touch driving electrodes Tx is reduced to some extent, but the induction capacitance is greatly reduced.

Generally, since size of the pattern pixel of electrodes for the touch function is on the order of millimeter and size of a pixel unit for the display function is on the order of micrometer, thus each of the touch driving electrodes Tx and each of the common electrodes Vcom forming the common electrode layer generally may correspond to a plurality of rows of pixel units and each of the touch sensing electrodes may generally correspond to a plurality of columns of pixel units, naturally without excluding the case that each of the touch driving electrodes Tx or each of the common electrodes Vcom corresponds to a row of pixel units and each of the touch sensing electrodes corresponds to a columns of pixel unit. In addition, the individual touch sensing electrode Rx are separated generally along the gap between adjacent pixel units, and the touch driving electrodes Tx and the common electrodes Vcom are separated generally along the gap between adjacent pixel units.

Generally, on the array substrate of the traditional ADS liquid crystal panel, the common electrodes implemented as a plate electrode are located on a lower layer (i.e. closer to the supporting base of the array substrate), the pixel electrodes implemented as slit electrodes are located on a upper layer (i.e. closer to the liquid crystal layer), and an insulating layer is arranged between the pixel electrodes and the common electrodes. On the array substrate of the HADS liquid crystal panel, the pixel electrodes implemented as a plate electrode are located on a lower layer (i.e. closer to the supporting base of the array substrate), the common electrodes implemented as slit electrodes are located on a upper layer (i.e. closer to the liquid crystal layer), and an isolating layer is arranged between the pixel electrodes and the common electrodes.

Particularly, according to the type of the liquid crystal panel to which the above touch panel is applied, the individual touch driving electrodes Tx and the common electrodes Vcom forming the common electrode layer may have a slit-shaped transparent electrode structure or a plate-shaped transparent electrode structure at the position corresponding to the aperture region of the pixel units. That is, for the HADS type, the individual touch driving electrodes Tx and the common electrodes Vcom are formed by the slit-shaped ITO electrodes; particularly, the slit-shaped ITO electrode structure is a structure wherein slit ITO electrodes are located at the aperture region of the pixels. For the ADS type, the individual touch driving electrodes and the common electrodes are formed by the plate-shaped ITO electrodes so as to meet the requirement of liquid crystal display, and in this case, induction capacitors are formed, through the slit region of the pixel electrodes, between the touch driving electrodes Tx and the touch sensing electrodes Rx on the color filter substrate. Since the particular structures of the ADS liquid crystal panel and the HADS liquid crystal panel belong to the common knowledge in the art, detail descriptions for such structures will be omitted.

In order to reduce the interference of other signals, such as electrical signals on gate signal lines, data signal lines or pixel electrodes, in the electrical signal transmitted on the touch driving electrode, the common electrode layer formed by the individual touch driving electrodes and the common electrodes is arranged above the pixel electrodes on the TFT array substrate, that is, the HADS type is adopted, such that the interference in the signal of the touch driving electrode Tx caused by other signals can be reduced as much as possible.

Particularly, when the touch sensing electrodes Rx are set on the color filter substrate, the touch sensing electrodes Rx are usually set on one side of the color filter substrate facing the liquid crystal layer, which is helpful for the thinning process for the supporting base of the array substrate after a liquid crystal cell is formed by the color filter substrate and the TFT array substrate. In addition, in order to maximum the distance between the touch sensing electrodes Rx and the touch driving electrodes Tx and minimize the induction capacitance therebetween, the individual touch sensing electrodes Rx are usually located between the supporting base of the color filter substrate and a black matrix region, that is, during the preparation of the color filter substrate, the pattern of the touch sensing electrodes Rx is prepared firstly and then the pattern of the black matrix region is prepared on the touch sensing electrodes Rx.

Figure 10:
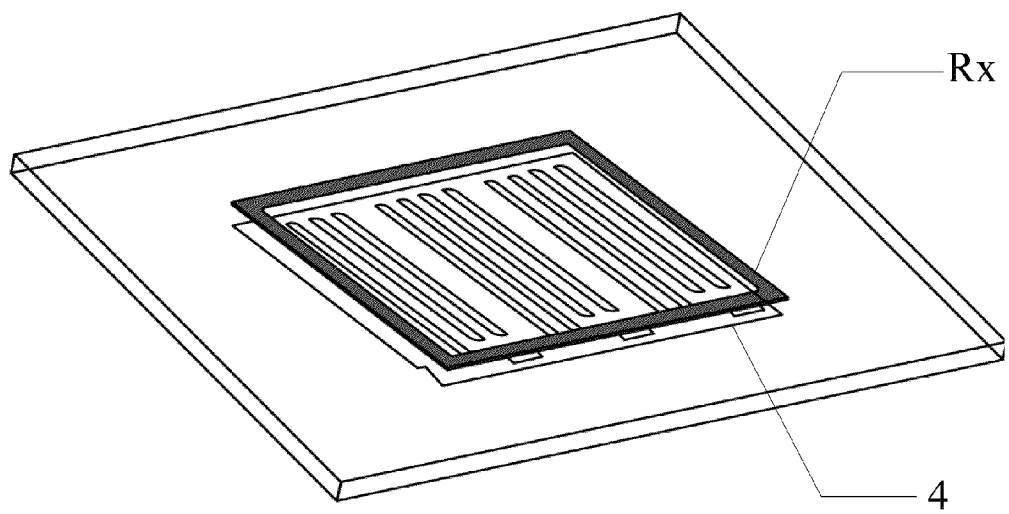
FIG. 10 is a schematic structural diagram of a location where an concave portion of a touch sensing electrode overlaps a pixel unit as provided in the embodiment of the present disclosure.
Figure 11:
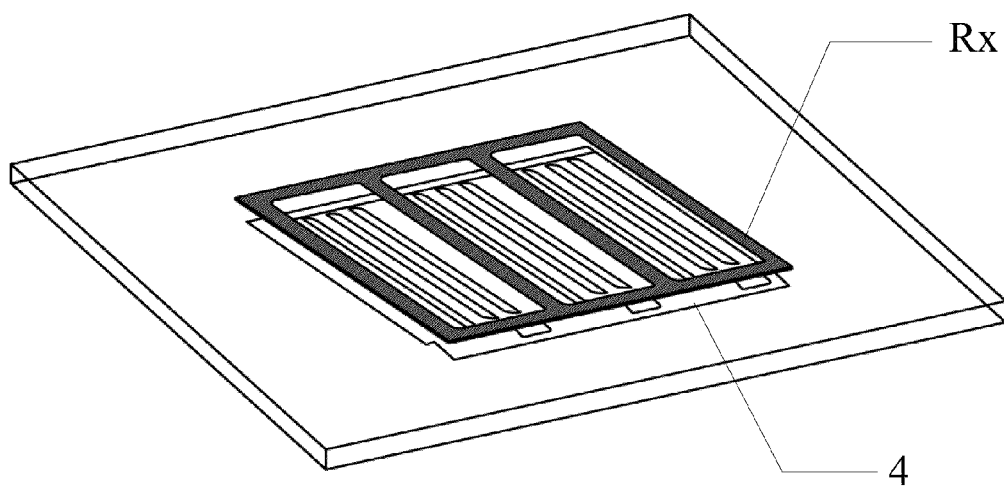
FIG. 11 is a schematic structure diagram of a location where a convex structure of a touch sensing electrode overlaps a pixel unit as provided in the embodiment of the present disclosure.

Specifically, in order to avoid affecting the normal display of the touch panel, each of the touch sensing electrodes Rx will generally be designed to have a grid-shaped electrode structure, and the grid-shaped electrode structure of the touch sensing electrode can be completely covered by the black matrix region, as shown in FIG. 10 and FIG. 11.

Further, in the design of a specific pattern for the concave portions of the touch sensing electrodes Rx, in order to minimize the facing area between the concave portions and the touch driving electrodes Tx, each of meshes in the concave portions of the touch sensing electrodes may be larger than each of meshes in the convex structures thereof. Specifically, the pattern of the touch sensing electrodes can be set at the locations where the concave portions correspond to the non-aperture regions of the pixel unit, and a hollow-out structure design is adopted in the concave portions, for example, as shown in FIG. 10, in the design of the pattern of the concave portion of the touch sensing electrodes Rx, no pattern of the touch sensing electrodes Rx is arranged at the position corresponding to gaps among RGB sub-pixel units 4 forming one pixel unit. Of course, those skilled in the art can also derive that a part of the pattern of the touch sensing electrodes Rx can be arranged at the position corresponding to gaps among the pixel units 4. In a specific implementation, the specific design of the pattern of the concave portion of the touch sensing electrodes Rx can be made according to the requirement for touch accuracy of the touch panel, no limitation is made thereto in the embodiment of the present disclosure.

Based on the same inventive concept, in another embodiment of the present disclosure, there is further provided a display apparatus including the capacitive in-cell touch panel provided in the above embodiment of the present disclosure. For implementations of the display apparatus, please refer to the embodiment of the above capacitive in-cell touch panel, repeated description will be omitted.

In the capacitive in-cell touch panel, the driving method thereof and the display apparatus provided in the embodiments of the present disclosure, the touch sensing electrodes are set on the color filter substrate, the common electrode layer connected as a whole plane on the existing TFT array substrate is divided into strips to be used as touch driving electrodes; by adopting the dual gate structure in the TFT array substrate, position of a part of data signal lines can be saved at the cost of doubling the number of the gate signal lines, and the touch driving signal lines can be set in the saved position, which is helpful for a narrow frame design of the touch panel as compared to arrangement in the prior art wherein the touch driving signal lines are set in a non-display area of the touch panel; one touch driving electrode is electrically connected to at least one touch driving signal line and is supplied with a driving signal by a plurality of touch driving signal lines simultaneously, such that transmission efficiency of the driving signal can be improved to the maximum extent and delay of the driving signal can be reduced. Moreover, since the touch function and the display function are driven in the time division manner, on one hand, the chip for implementing the display driving and the chip for implementing the touch driving can be integrated together, so that the production cost can be further reduced; on the other hand, the time division driving of the touch function and the display function can also reduce the interference between the display function and the touch function, so that picture quality and touch accuracy can be enhanced.

The above descriptions are only for illustrating the embodiments of the present disclosure, and in no way limit the scope of the present disclosure. It will be obvious that those skilled in the art may make modifications, variations and equivalences to the above embodiments without departing from the spirit and scope of the present disclosure as defined by the following claims. Such variations and modifications are intended to be included within the spirit and scope of the present disclosure.

What is claimed is:

1. A capacitive in-cell touch panel comprising: a color filter substrate, a thin film transistor TFT array substrate having a common electrode layer, and a liquid crystal layer between the color filter substrate and the TFT array substrate, wherein a plurality of pixel units arranged in a matrix are set in the capacitive in-cell touch panel; two gate signal lines are arranged between two adjacent rows of pixel units on the TFT array substrate, and two adjacent columns of pixel units constitute a group and commonly use a same data signal line located between the two adjacent columns of pixel units, wherein, the color filter substrate has a plurality of touch sensing electrodes;

the common electrode layer of the TFT array substrate has a plurality of touch driving electrodes, each of which is electrically connected to at least one touch driving signal line located between two adjacent groups of columns of pixel units; during a display period of a frame of picture, each of the touch driving signal lines electrically connected to the touch driving electrode is used to transmit a common electrode signal and a touch scanning signal to the touch driving electrode in a time division manner;

wherein each of the touch driving electrodes has concave structures in areas overlapping with the touch sensing electrode;

the common electrode layer of the TFT array substrate further has a plurality of common electrodes, and each of the common electrodes is located within the concave structures between the adjacent touch driving electrodes and is isolated from the touch driving electrodes.

2. The capacitive in-cell touch panel of claim 1, wherein each of the touch sensing electrodes is extended along a direction of columns of the pixel units and each of the touch driving electrodes is extended along a direction of rows of the pixel units.

3. The capacitive in-cell touch panel of claim 1, wherein the touch driving signal lines are set on a same layer as the data signal lines in the TFT array substrate;

and each of the touch driving signal lines is electrically connected to a corresponding touch driving electrode through at least one via-hole.

4. The capacitive in-cell touch panel of claim 3, wherein each of the touch driving electrode is electrically connected to a plurality of touch driving signal lines, and the plurality of touch driving signal lines electrically connected to a same touch driving electrode are connected through wires.

5. The capacitive in-cell touch panel of claim 4, further comprising a plurality of metal lines arranged in a same layer as each of the touch driving signal lines and isolated from each other, wherein each of the metal lines and each of the touch driving signal lines form a co-linear relationship, and each of the metal lines is connected in parallel to a corresponding touch driving electrode; a length of each of the metal lines is not more than a width of the corresponding parallel touch driving electrode.

6. The capacitive in-cell touch panel of claim 1, further comprising at least one common electrode line electrically connected to the common electrodes, wherein the at least one common electrode line is set in the gap between adjacent groups of columns of pixel units where no touch driving signal line is set.

7. The capacitive in-cell touch panel of claim 1, wherein each of the touch sensing electrodes has concave portions in areas overlapping with the touch driving electrode, and has convex structures in areas overlapping with the common electrodes.

8. The capacitive in-cell touch panel of claim 7, wherein each of the touch driving electrodes or each of the common electrodes corresponds to a plurality of rows of pixel units, and each of the touch sensing electrodes corresponds to a plurality of columns of pixel units.

9. The capacitive in-cell touch panel of claim 8, wherein each of the touch driving electrodes or each of the common electrodes has a slit-shaped transparent electrode structure at the position corresponding to the aperture region of the pixel units, and the touch driving electrodes and the common electrodes are located above pixel electrodes in the TFT array substrate.

10. The capacitive in-cell touch panel of claim 8, wherein each of the touch sensing electrodes are located between a supporting base of the color filter substrate and a black matrix region.

11. The capacitive in-cell touch panel of claim 10, wherein each of the touch sensing electrodes has a grid-shaped electrode structure which is completely covered by the black matrix region.

12. The capacitive in-cell touch panel of claim 11, wherein each of meshes in the concave portions of the touch sensing electrodes is larger than each of meshes in the convex structures thereof.

13. A display apparatus comprising the capacitive in-cell touch panel of claim 1.

14. A driving method of the capacitive in-cell touch panel of claim 1 comprising:
dividing a time period for the capacitive in-cell touch panel displaying a frame of picture into a display period and a touch period;
during the display period, supplying a common electrode signal to the touch driving electrodes, meanwhile supplying gate scanning signals to each of the gate signal lines in the capacitive in-cell touch panel sequentially and supplying gray scale signals to the data signal lines so as to control deflection of liquid crystal molecules;
during the touch period, supplying the touch driving electrodes with the touch scanning signals which are then coupled by the touch sensing electrodes to generate and output voltage signals, meanwhile no signal being supplied to each of the gate signal lines and each of the data signal lines of the capacitive in-cell touch panel.

* * * * *